US011074294B2

(12) United States Patent
Natarajan

(10) Patent No.: US 11,074,294 B2
(45) Date of Patent: Jul. 27, 2021

(54) SYSTEM AND METHOD FOR DIRECTED ACYCLIC GRAPH (DAG) ENCODING INTO HASH LINKED BLOCKS

(71) Applicant: Ananth Natarajan, Houston, TX (US)

(72) Inventor: Ananth Natarajan, Houston, TX (US)

(73) Assignee: Ananth Natarajan, Houston, TX (US)

( * ) Notice: Subject to any disclaimer, the term of this patent is extended or adjusted under 35 U.S.C. 154(b) by 0 days.

(21) Appl. No.: 16/911,284

(22) Filed: Jun. 24, 2020

(65) Prior Publication Data

US 2021/0004411 A1 Jan. 7, 2021

Related U.S. Application Data

(60) Provisional application No. 62/870,030, filed on Jul. 2, 2019.

(51) Int. Cl.
*G06F 16/901* (2019.01)
*G06F 17/16* (2006.01)

(52) U.S. Cl.
CPC .......... *G06F 16/9024* (2019.01); *G06F 17/16* (2013.01)

(58) Field of Classification Search
CPC ............. G06F 16/9024; G06F 16/2379; G06F 16/24568; G06F 16/00; G06F 21/64; G06F 9/485; G06F 16/2322; G06F 16/2329; G06F 16/2477; G06F 16/951; G06F 3/01; G06F 3/011; G06F 3/016; G06F 3/0346; G06F 40/30; G06F 7/5443; G06F 9/3001; G06F 9/30036; G06F 9/3851; G06F 9/4881; G06F 9/5038; G06F 9/542; G06F 9/546; G06F 16/168; G06F 16/1734; G06F 16/2246; G06F 16/2358; G06F 16/24545; G06F 16/24547; G06F 16/2456; G06F 16/2465; G06F 16/2471; G06F 16/248; G06F 16/27; G06F 16/93; G06F 16/9535; G06F 16/9558; G06F 16/958; G06F 17/16; G06F 17/18; G06F 21/16; G06F 21/53; G06F 21/554; G06F 21/577; G06F 2221/034; G06F 3/013; G06F 3/0482; G06F 40/242;

(Continued)

(56) References Cited

U.S. PATENT DOCUMENTS 9,383,988 B2 * 7/2016 Rychikhin ................ G06F 8/65
10,075,298 B2 * 9/2018 Struttmann .......... G06F 21/6218
(Continued)

*Primary Examiner* — Sheree N Brown

(57) ABSTRACT

The disclosure relates a method to encode Directed Acyclic Graphs (DAG) as linked networks of blocks, with each block containing the fingerprints of preceding blocks in the form of their hashes. This results in the DAG being represented by a series of blocks sequentially connected by hash pointers. This requires the hashes of every block that is an immediate predecessor to be included in a succeeding block. The blocks are associated with DAG vertices. A block may therefore have multiple succeeding blocks or multiple preceding blocks as in a DAG. The method determines the DAG starting vertices. Block creation and hash operations are subsequently performed. Successor vertices are determined, and their blocks and block hashes progressively generated when it is determined that the hashes of all blocks corresponding to preceding vertices have been generated. This continues until all DAG vertices have been processed and are associated with a block.

20 Claims, 10 Drawing Sheets

(58) Field of Classification Search
CPC ...... G06F 5/01; G06F 9/30014; G06F 9/3016; G06F 9/466; G06F 9/5027; G06F 9/5072; G06F 9/544; G06F 11/004; G06F 11/07; G06F 11/0709; G06F 11/076; G06F 11/10; G06F 11/1471; G06F 11/1474; G06F 11/2094; G06F 11/2097; G06F 11/3037; G06F 11/34; G06F 11/3409; G06F 11/3466; G06F 11/3476; G06F 11/3612; G06F 11/3636; G06F 11/366; G06F 12/0806; G06F 13/00; G06F 13/4027; G06F 15/8046; G06F 16/119; G06F 16/137; G06F 16/148; G06F 16/152; G06F 16/178; G06F 16/182; G06F 16/1824; G06F 16/213; G06F 16/215; G06F 16/2365; G06F 16/2393; G06F 16/245; G06F 16/24522; G06F 16/2453; G06F 16/24573; G06F 16/24578; G06F 16/2458; G06F 16/2468; G06F 16/25; G06F 16/275; G06F 16/283; G06F 16/284; G06F 16/29; G06F 16/345; G06F 16/35; G06F 16/367; G06F 16/374; G06F 16/38; G06F 16/45; G06F 16/55; G06F 16/5866; G06F 16/9014; G06F 16/9027; G06F 16/908; G06F 16/9538; G06F 16/955; G06F 17/153; G06F 21/55; G06F 21/566; G06F 21/567; G06F 21/602; G06F 21/72; G06F 21/76; G06F 2201/805; G06F 2201/81; G06F 2201/83; G06F 2207/382; G06F 2207/3824; G06F 2207/4824; G06F 2209/501; G06F 2209/5017; G06F 2209/508; G06F 2216/03; G06F 2221/033; G06F 30/20; G06F 30/392; G06F 3/0481; G06F 3/04817; G06F 3/0485; G06F 3/0488; G06F 3/0635; G06F 3/067; G06F 3/0679; G06F 40/106; G06F 40/186; G06F 40/197; G06F 40/20; G06F 40/216; G06F 40/232; G06F 40/279; G06F 40/284; G06F 40/295; G06F 40/44; G06F 5/06; G06F 7/483; G06F 7/501; G06F 7/523; G06F 7/725; G06F 8/36; G06F 8/433; G06F 8/61; G06F 8/71; G06F 9/30087; G06F 9/3009; G06F 9/30192; G06F 9/3802; G06F 9/3836; G06F 9/3885; G06F 9/44505; G06F 9/45508; G06F 9/45533; G06F 9/4806; G06F 9/4887; G06F 9/5005; G06F 9/5016; G06F 9/5022; G06F 9/5033; G06F 9/5044; G06F 9/505; G06F 9/5055; G06F 9/5061; G06F 9/5066; G06F 9/5077; G06F 9/526; G06F 9/54
USPC ........................................................ 707/798
See application file for complete search history.

(56) References Cited

U.S. PATENT DOCUMENTS

| | | | |
|---|---|---|---|
| 10,121,019 B2* | 11/2018 | Struttmann | ........... H04L 9/0618 |
| 10,255,108 B2* | 4/2019 | Dillenberger | ........... G06F 16/28 |
| 10,911,241 B2* | 2/2021 | Struttmann | ............. G06F 21/78 |
| 2012/0039190 A1* | 2/2012 | Vasseur | ................... H04L 47/15 |
| | | | 370/252 |
| 2012/0155329 A1* | 6/2012 | Shaffer | ................. H04L 45/023 |
| | | | 370/255 |
| 2013/0223218 A1* | 8/2013 | Vasseur | ............... H04L 43/0876 |
| | | | 370/232 |
| 2014/0129734 A1* | 5/2014 | Vasseur | ................. H04L 45/121 |
| | | | 709/241 |
| 2017/0212781 A1* | 7/2017 | Dillenberger | ........... G06F 16/28 |

* cited by examiner

DAG 200 which is analogous to DAG 30 illustrated in FIG. 1

GANTT Chart representation of Project Network Diagram represented by DAG 200 in FIG. 2

| a. | 1 | → | 3 | → | 7 | → | 13 | → | 14 | | | | |
|---|---|---|---|---|---|---|---|---|---|---|---|---|---|
| b. | 1 | → | 3 | → | 8 | → | 11 | → | 13 | → | 14 | | |
| c. | 1 | → | 3 | → | 8 | → | 11 | → | 12 | → | 14 | | |
| d. | 1 | → | 2 | → | 5 | → | 9 | → | 11 | → | 13 | → | 14 |
| e. | 1 | → | 2 | → | 5 | → | 9 | → | 11 | → | 12 | → | 14 |
| f. | 1 | → | 2 | → | 5 | → | 9 | → | 10 | → | 12 | → | 14 |
| g. | 1 | → | 2 | → | 4 | → | 10 | → | 12 | → | 14 | | |
| h. | 1 | → | 2 | → | 4 | → | 6 | → | 10 | → | 12 | → | 14 |

Paths between starting and ending vertices of DAG 200 in FIG. 2

FIG. 4

| Row Number \ Column Number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 0 | 1 | 1 | 0 | 0 | 0 | 0 | 0 | 0 | 0 | 0 | 0 | 0 | 0 |
| 2 | 0 | 0 | 0 | 1 | 1 | 0 | 0 | 0 | 0 | 0 | 0 | 0 | 0 | 0 |
| 3 | 0 | 0 | 0 | 0 | 0 | 0 | 1 | 1 | 0 | 0 | 0 | 0 | 0 | 0 |
| 4 | 0 | 0 | 0 | 0 | 0 | 1 | 0 | 0 | 0 | 1 | 0 | 0 | 0 | 0 |
| 5 | 0 | 0 | 0 | 0 | 0 | 0 | 0 | 0 | 1 | 0 | 0 | 0 | 0 | 0 |
| 6 | 0 | 0 | 0 | 0 | 0 | 0 | 0 | 0 | 0 | 1 | 0 | 0 | 0 | 0 |
| 7 | 0 | 0 | 0 | 0 | 0 | 0 | 0 | 0 | 0 | 0 | 0 | 0 | 1 | 0 |
| 8 | 0 | 0 | 0 | 0 | 0 | 0 | 0 | 0 | 0 | 0 | 1 | 0 | 0 | 0 |
| 9 | 0 | 0 | 0 | 0 | 0 | 0 | 0 | 0 | 0 | 1 | 1 | 0 | 0 | 0 |
| 10 | 0 | 0 | 0 | 0 | 0 | 0 | 0 | 0 | 0 | 0 | 0 | 1 | 0 | 0 |
| 11 | 0 | 0 | 0 | 0 | 0 | 0 | 0 | 0 | 0 | 0 | 0 | 1 | 1 | 0 |
| 12 | 0 | 0 | 0 | 0 | 0 | 0 | 0 | 0 | 0 | 0 | 0 | 0 | 0 | 1 |
| 13 | 0 | 0 | 0 | 0 | 0 | 0 | 0 | 0 | 0 | 0 | 0 | 0 | 0 | 1 |
| 14 | 0 | 0 | 0 | 0 | 0 | 0 | 0 | 0 | 0 | 0 | 0 | 0 | 0 | 0 | n x n (14 x 14) matrix that is the Adjacency Matrix "A" of DAG 200 in FIG. 2

FIG. 5

SYSTEM AND METHOD FOR DIRECTED ACYCLIC GRAPH (DAG) ENCODING INTO HASH LINKED BLOCKS

RELATED PATENT APPLICATIONS

This patent application claims the benefit of U.S. provisional patent application No. 62/870,030 filed on Jul. 2, 2019, entitled SYSTEM AND METHOD FOR DIRECTED ACYCLIC GRAPH (DAG) ENCODING INTO HASH LINKED BLOCKS, naming Ananth Natarajan as the inventor. The entire content of the foregoing application is incorporated herein by reference, Including all text, tables and drawings.

FIELD OF THE INVENTION

The field of the invention relates to the usage of chains of hash-linked blocks as a datastore for the storage and tracking of data, embedded in Directed Acyclic Graphs (DAGs).

Embodiments of the present invention pertain to the encoding of networks which may include: storage, communication, cause and effect, hierarchical etc. that can be represented by topologically ordered vertices connected by directed edges, such that the unique signature of the payload of all immediately preceding vertices is present in the payload of any vertex. The unique signature is verifiable by association with the payload from which it is generated. Therefore, the signature of a block of data in a preceding vertex is present in the block of data in a following vertex, allowing for non-repudiation of precedence in these networks or graphs and tamper-resistance. This method and algorithm make possible networks where one block may have multiple preceding blocks and/or multiple succeeding blocks. It is associated with the non-trivial problem of creating these block-based networks when the tip or tips of the DAG have moved on such that the precedence relationships between the existing vertices are known, but the blocks have not been written from the existing vertices. This is a key ingredient in overcoming limitations of present implementations of blockchain technology that predominantly use one-to-one relationships between blocks. Blockchains and types of blockchains with many valid topological sorts can be generated from DAGs, rather than the limitation to one valid topological sort in implementations related to Blockchain technology such as Bitcoin, Ethereum, or Hyperledger.

BACKGROUND OF THE INVENTION

Directed Acyclic Graphs (DAG) encode sequential information in many fields, disciplines and methods. These include, but are not limited to: software applications, data storage structures, cause and effect diagrams, communication networks, web data analysis, project networks such as schedules where multiple activities are connected to one another from a project start to finish; supply-chains where multiple aggregations of components and raw materials flow into end products; organizational networks; classification schemes; communication networks; and so on.

The presence of a unique signature of a payload of each vertex that originates a directed edge of the DAG in the corresponding vertex that terminates that edge can confer many benefits such as provenance, non-repudiation, tamper-resistance, decentralized proof, etc. to any sequence that can be represented by a DAG. This can be realized by the encoding of a DAG into a series of blocks, where each block corresponds to a DAG vertex and contains the hashes of the vertices that immediately precede it. Blocks represent the vertices of the DAG and hash pointers represent the directed edges connecting the vertices. The relationship between the blocks of a DAG becomes verifiable without requiring a trusted central party. Blockchain use cases such as in financial, currency, and supply-chain, will be significantly improved and increased by the enabling of multidimensional blockchains allowing more possibilities than current implementations. As an example, use case, project networks such as a project schedule are usually represented as PERT charts which are DAGs. These project networks DAGs are time bound linked activity chains of vertices sequentially connected by directed edges in their temporal order, where the edges or vertices may represent project activities or milestones. A time bound activity chain may be represented by a series of project milestones encoded as blocks and edges which represent a series of project activities. The presence of the hash of each activity in a succeeding activity can allow stakeholders such as project owners, project value creators, regulatory agencies, and government authorities to immutably plan, create and track progress of projects. Some other information, models and flows that can be represented as DAGs include bayesian networks, networks of webpages, genealogy tables, decision trees, consequence diagrams, citation networks, and so on.

The blocks representing the vertices are linked by hash pointers. The hash pointer is generated using a hash function, wherein a hash function H can be described as a transformation that takes any variable-size input p, along with any other inputs such as a variable-size key k, and returns a fixed-size output or hash h (e.g., hash pointer), $h=H(p, k)$. Each hash pointer references a block containing, wholly or in part, the payload of a vertex of the DAG.

Blockchain, or more generally distributed ledger technology, promises to provide secure, immutable, and distributed data records. Aspects of Blockchain technology can be applied to create blocks linked to each other by the presence of the hash of a preceding block in a following block. However, despite these benefits, a conventional blockchain may be insufficient to model a DAG in a representative manner. Current references to "Blockchain" is usually to a ledger of transactions that grow as "blocks" when completed authenticated transactions are added in a linear, chronological order. The limitations associated with this linear one-to-one encoding will have to be overcome to make Blockchain encoding of DAGs possible. Blockchain encoding of DAGs will require a payload with the unique signatures of all previous blocks to be present in every block that immediately follows and Blockchain implementations consisting of directed linear one-to-one blocks cannot properly address the several applications that require "multidimensional" Blockchains where each block may have more than one successor or predecessor. A sequence that can be represented as a Directional Acyclic Graph (DAG) will require such multidimensional directed Blockchains. These and other problems exist with conventional blockchain technologies. Thus, there is a need for a technical solution whereby the reliability and security conferred by hash pointers can be extended to networks and graphs that can be represented as a DAG by generating blocks linked by hash pointers.

The present invention provides a novel method to make "multidimensional" encoding of DAGs as linked blocks with each block containing the hash of its preceding blocks possible.

SUMMARY

The disclosure relates systems and methods to encode a DAG (Directed Acyclic Graph) into a network of blocks linked by their hashes, each block corresponding to a vertex of the DAG. The hash of any immediately preceding block is present in all its successors and any block may have multiple successors or multiple predecessors in keeping with the nature of a DAG. The creation and storage of a block containing the payload of a DAG vertex and the creation and storage of a hash of that block is referred to as "processing." The exemplary non-limiting methods illustrated and described here make no assumptions about the format of the data format or encoding for the storage of this block. Several formats are used in existing blockchain implementations, and any format such as json, XML etc. may be used. Storage of a block may be in any media including but not limited to electronic, optical, mechanical, or paper. This processing results in the DAG being represented by a series of blocks sequentially connected by hash pointers.

The methods use the Adjacency Matrix representation of the DAG and are predicated on the following: The succeeding vertex numbers of any vertex i are the column numbers of the non-zero cells on the i'th row of the Adjacency Matrix A; The preceding vertex numbers of any vertex j are the row numbers of the non-zero cells on the j'th column of the Adjacency Matrix A; Use of a data store array to recursively store identified successors of a starting or processed Vertex number; Use of a data store to store the Vertex Numbers of hashed payloads; Writing a block belonging to a DAG vertex only after all preceding vertex blocks have been created and their hashes obtained, as all the hashes of preceding blocks will need to be in that block; Vertices will remain in the data store for identified successors of a starting or processed vertex number till all their predecessors have blocks; Blocks are written by passing the vertex number, the predecessors and their hashes, as arguments to a block engine with suitable methods, functions and/or classes. The architecture of this block engine is not described here as this disclosure is agnostic to the specifics of block contents, block file formats, hash functions, etc.

In order to carry out this method the following core steps are followed: Create Adjacency Matrix from the DAG, Find and process DAG starting vertices, Identify successor vertices of starting vertices, Process remaining DAG vertices. Ultimately, at the conclusion of these steps, blocks corresponding to all the vertices of the DAG are created, such that each block contains the hash of its preceding block.

BRIEF DESCRIPTION OF THE DRAWINGS

FIG. 4 illustrates the many valid topological sorts shown as paths directed from starting vertex 1 to ending vertex 14 of FIG. 1

FIG. 5 illustrates an n×n matrix that is the Adjacency Matrix "A" of DAG 200.

DETAILED DESCRIPTION OF THE INVENTION

Figure 1:
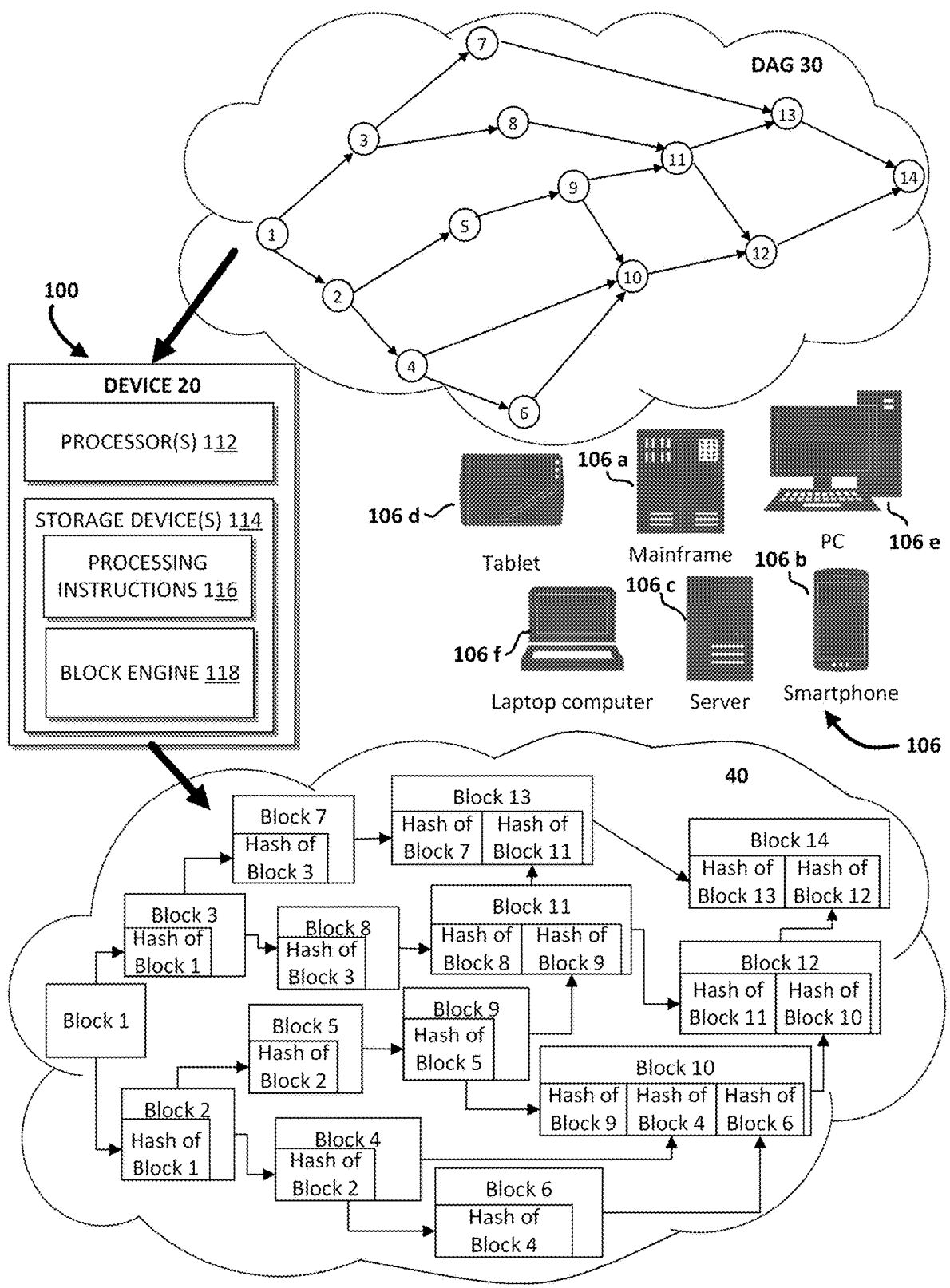
FIG. 1 illustrates an example of a system for processing a directed acyclic graph (DAG) to encode it into hash linked blocks in accordance with one embodiment of the present disclosure

FIG. 1 illustrates an example of a system 100 for writing a set of hash linked blocks representing the DAG consisting of vertices connected by directed edges. System 100 will systematically process Directed Acyclic Graphs (DAGs) to identify and create Blocks from vertices such that the blocks of a vertex contains the hashes of their immediately preceding blocks. In general, the present disclosure contemplates any system 100 that provides systematic and effective exploration of DAGs, identifying the starting vertices, the creation of blocks from these in any arbitrary file format, the creation of the hashes of these blocks, in the order in which they are sequenced, such that a block and its hash are created only after all its preceding blocks have been hashed. In one embodiment, the logical and programmatic concerns include: i) How to explore a DAG; ii) What is the structure of the DAG that needs to be explored (the order and sequence of the vertices); iii) How to ensure that the block of a vertex is created only after all the preceding vertices have blocks and their hashes of those blocks; and iv) How to create blocks from all vertices and recognize when all vertices have been processed.

Device 20 shown as part of the system 100 in FIG. 1 illustrates an example of a device in a system for executing the methods described here for the hash linked block encoding of DAGs, according to an implementation of the invention. This is illustrated by the encoding of the DAG 30 into the hash linked blocks network 40. The device 20 may include one or more processors 112, one or more storage devices 114, and/or other components. The storage devices 114 may store one or more instructions that program the processors 112 to perform the functions to resolve the logical and programmatic concerns described herein. The one or more instructions may include, without limitation: processing instructions 116, a block engine 118, and/or other instructions. The processing instructions 116 may describe methods and processes to parse the DAG systematically, first identifying vertices which either do not have preceding vertices, and then those vertices whose preceding vertices are all associated with blocks and block hashes, passing these on to block engine 118. Block engine 118 may write the vertices of the DAG as blocks containing the hashes of their preceding vertices. Block engine 118 may also create the hashes of blocks that have been so created. Block engine 118 may use one or more functions, methods, classes or any other algorithms, internal or external to the device 20, and internal or external to the system 100.

The system 100 may be embodied by a single participant device but it may also include a plurality of participant devices 106, illustrated in FIG. 1 as participant devices 106 a, 106 b, 106 c, 106 d, 106 e, and 106 f. Each participant device 106 may be a computing device which can provide some or all the functionality provided in device 20. The participant device 106 may be suitable for the processing of the DAG and the submission of transactions containing a vertex payload, and hashes of blocks belonging to preceding vertices of that vertex, for inclusion in a new block to be added to the multidimensional blockchain representing the DAG. The computing device may be a desktop computer, laptop computer, notebook computer, table computer, cellular phone, smart phone, smart television, smart watch, wearable computing device, implantable computing device, etc. They may perform these functions sequentially or in parallel, independently or together depending on the general application or use-case around the DAG.

Figure 2:
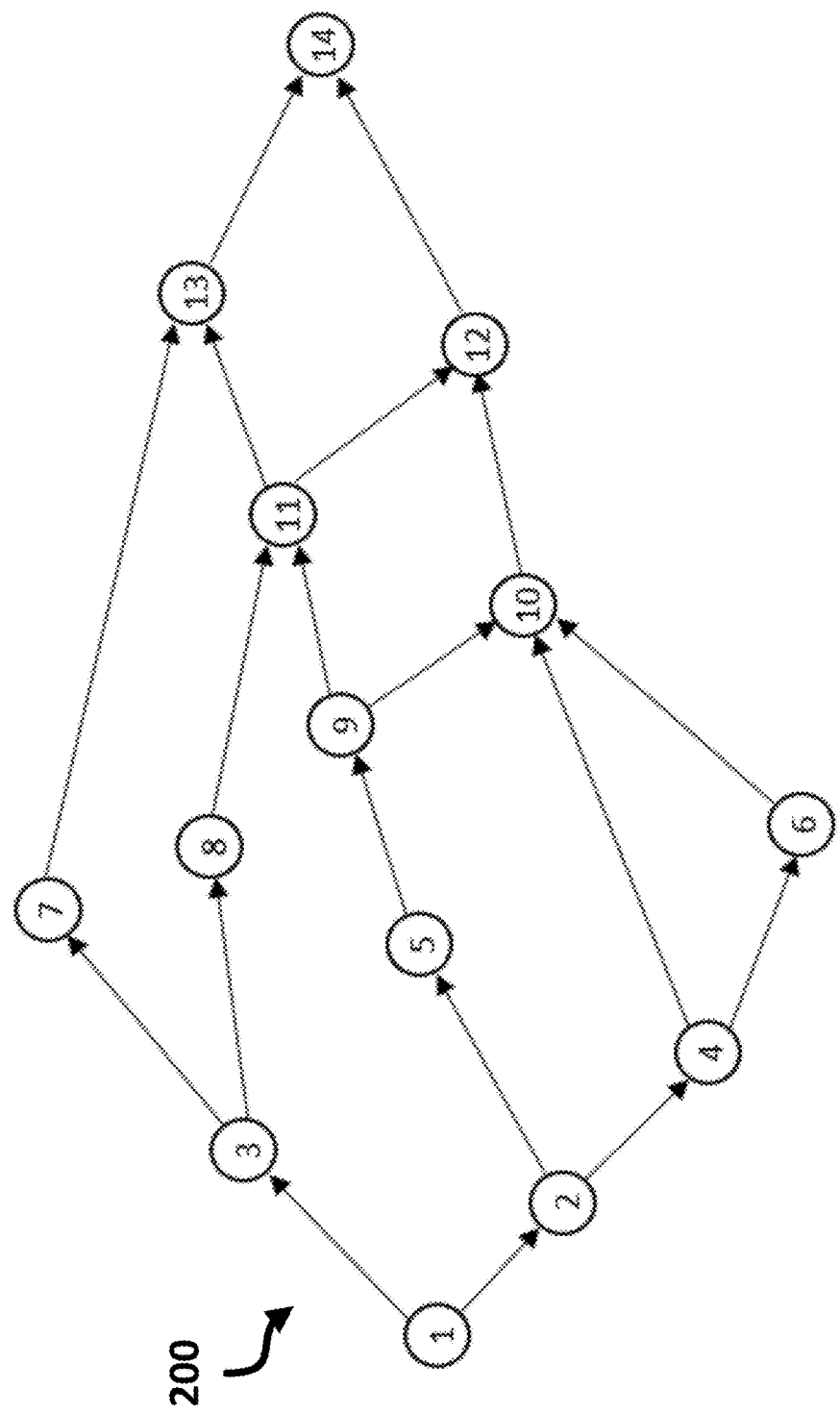
FIG. 2 is an example embodiment 200 of a DAG module illustrating a Project Network Diagram which starts at a single starting vertex 1 and terminates at a single ending vertex 14.
Figure 3:
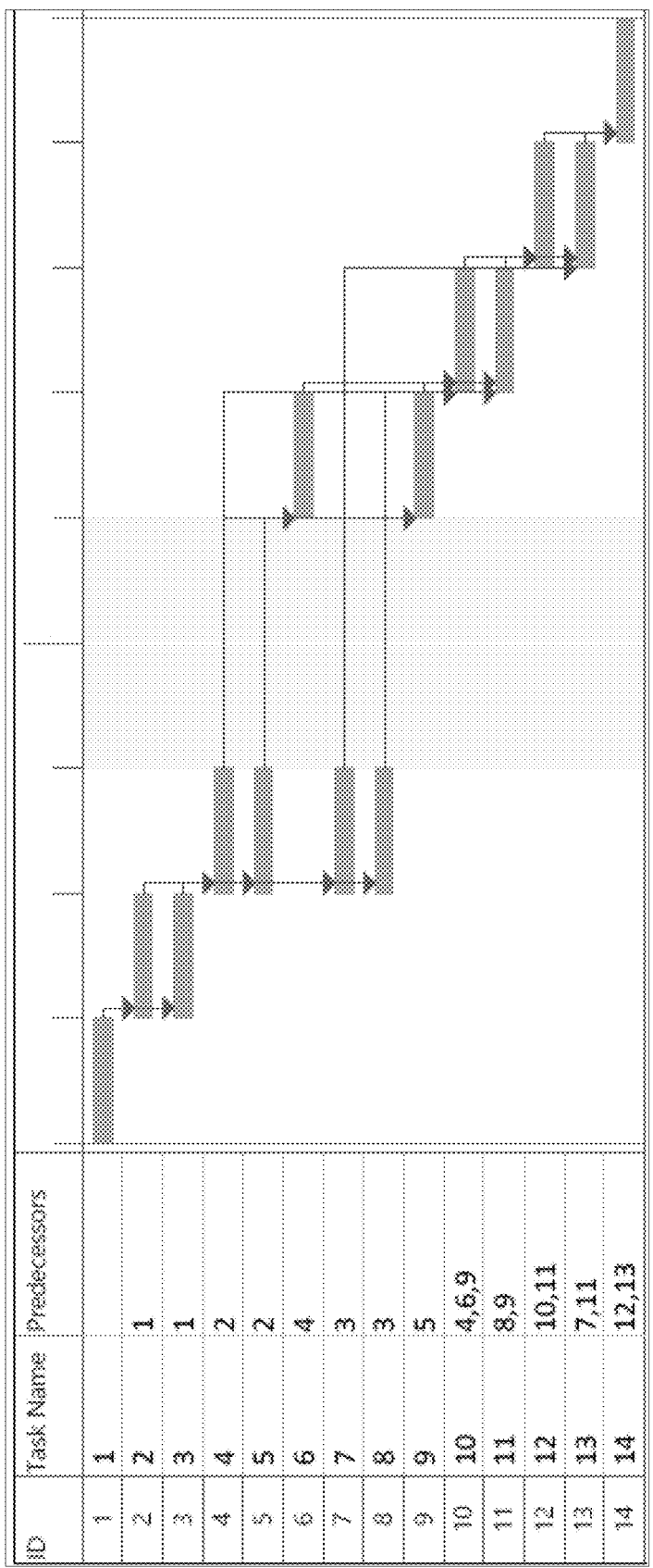
FIG. 3 is an example illustration of a GANTT Chart representation of Project Network Diagram in FIG. 2

FIG. 2 illustrates a DAG 200 that is used to exemplify a DAG that can be processed by the methods and processes described here into a series of blocks connected by hash pointers. This DAG is the same as the DAG 30 illustrated in relation to a system in FIG. 1. This is a DAG representation of a Project Network Diagram whose Project Flowchart is illustrated by a GANTT Chart in FIG. 3. This GANTT Chart representation of this network uses a uniform activity duration of 1 unit for each activity.

FIG. 5 illustrates the Adjacency Matrix A of the example DAG 200 which is illustrated in FIG. 2. For one realization the Adjacency matrix A shall be a square matrix with the same number of rows and columns. It will be a n-by-n matrix where n is the number of vertices of the directed graph. The vertices are represented uniquely by numbers in the exemplary realization described here. The vertices can be numbered arbitrarily and uniquely, but a linear ordering scheme that follows the temporal or other inherent order along the direction in the DAG is preferred. An edge between a pair of vertices (which may be blocks or nodes in different implementations represented by a DAG) is represented by a number. This number is represented by the numeral "1" in the exemplary realization described here. The absence of an edge is represented by the numeral "0" in the exemplary realization described here. In this realization the cells corresponding to the row number of an originating vertex of a directed edge and the column number of a terminating vertex in the matrix A contain a "1," while the remaining cells contain a "0." In other words: $A_{ij}=A_{i\rightarrow j}=1$ when there is an edge from vertex i to vertex j, and 0 (zero) otherwise.

FIG. 4. Illustrates the multiple chains that exist between vertices 1 and 14. The Adjacency Matrix in FIG. 5 incorporates all the paths that are shown in FIG. 4. Starting vertices of the DAG have all zeros in the column corresponding to their vertex number as can be seen in column 1 of the Adjacency Matrix in FIG. 5 which corresponds to the only starting vertex, Vertex 1 of the DAG illustrated in FIG. 2. Ending vertices of the DAG have all zeros in the row corresponding to their vertex number as can be seen in row 14 of the Adjacency Matrix in FIG. 5 which corresponds to the only ending vertex, Vertex 14 of the DAG illustrated in FIG. 2.

Figure 6:
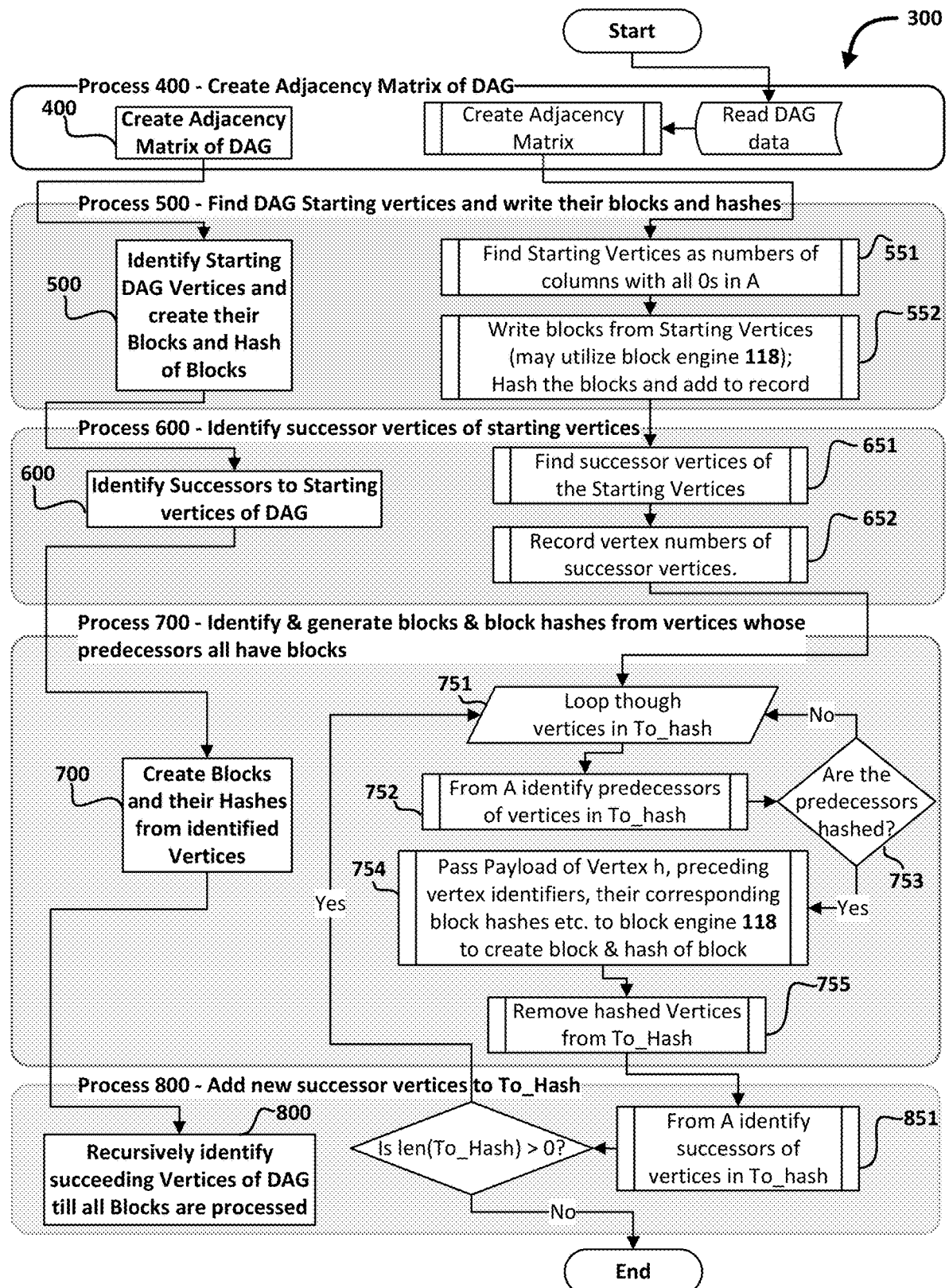
FIG. 6 illustrates an example flowchart illustrating a process 300 for processing of a DAG to encode it as linked blocks such that the hash of any immediately preceding block is present in all its successors in accordance with one embodiment of the present disclosure.

FIG. 6 is an example flow chart illustrating the process 300 for creating blocks from each vertex of a DAG with each of these blocks containing the hash of the blocks that are immediately previous to them in the DAG sequence. The process 300 is described in the methods included in the processing instructions 116 for parsing the DAG, first creating the Adjacency Matrix A in Step 400, identifying vertices which do not have preceding vertices in Step 500, identifying those vertices that succeed these vertices in Step 600, and then in Step 700, passing vertices whose preceding vertices are all associated with blocks and block hashes on to block engine 118 to write the vertices of the DAG as blocks and create the hash of those blocks. The hashes will uniquely identify the blocks from which they are generated. Block engine 118 may use functions, methods or classes that may be internal or external to device 20. Step 800 forms a recursive loop with Step 700, continually finding succeeding vertices till all the vertices have been processed using block engine 118. These steps are described sequentially in more detail below following which each of them is detailed and discussed separately.

As illustrated, the process 300 begins at step 400 with the creation of the Adjacency Matrix to represent the DAG. A "1" in a cell of the Matrix corresponding to the row number identical to the starting vertex number and the column number identical to the ending vertex number identifies it as an edge of the DAG. For special cases, the n in the n-by-n Matrix may be greater than the number of vertices, meaning that there may be empty columns that are not starting vertices of the DAG. For these instances, a column i of A where all the rows are "0", coinciding with a row i of A where all the columns are also "0", indicates that vertex i is not part of the DAG.

Step 500 of process 300 identifies the first vertices or first vertex in the DAG sequence. In the typical instance, blocks are generated from these vertices and contain a payload of contents associated with that vertex with any other pertinent information, and the block is written as a unique file associated with that block or appended to a unique file associated with the DAG. In the typical instance, generation of the hashes of those blocks and their storage in a temporary or permanent store will be performed. Step 500 finds DAG Starting vertices by parsing each column of the Adjacency Matrix in Step 551 to find all columns that do not have a "1" in any of their cells, followed by Step 552 for the creation and recording of blocks from the payload associated with those vertices and the computation of the hashes of those Blocks and the recording of them. the creation. The creation of blocks and the computation of their hashes in Step 552 may invoke block engine 118 with one or more functions, methods, classes or any other algorithms, internal or external to the device 20. Step 500 is described in more detail in FIG. 7 and in the description of FIG. 7 further below.

The next Step 600 of process 300 will identify the immediate successor vertices to the starting vertices. Step 600 contains Step 651 which finds the succeeding vertices to the DAG starting vertices by parsing each row of the Adjacency Matrix A, finding in each row whose number corresponds to a starting vertex, any cell with a "1" in as denoting a successor. The vertex number of the successor corresponds to the column number of that cell and Step 652 records these vertex numbers of the successor vertices. Step 600 is further described in more detail in FIG. 8 and in the description of FIG. 8 further below.

Steps 700 and 800 of process 300 constitute a recursive algorithm that will progressively identify and generate blocks & block hashes from vertices whose predecessors all have Blocks till all vertices have blocks. Step 700 verifies if the vertices immediately preceding the vertices from which blocks are to be created have their hashes and blocks already generated. Step 751 of Step 700 is part of a loop that iterates through the record of vertex numbers to be processed, the record being represented here by a data store named "To_Hash". The next step of the loop Step 752 identifies the vertices that precede the vertex identified to be processed, with decision step 753 returning control to Step 751 to iterate to the next vertex if the preceding vertices of the vertex to be processed have themselves not been processed. Thus, only vertices whose preceding vertices possess a block and a hash of that block may be processed. If this is positively verified the blocks and their hashes for those vertices are generated. If decision Step 753 determines that all preceding vertices of the vertex to be processed have been processed, Step 754 calls block engine 118 to process that vertex to create its block, such that the block contains the hashes of all the blocks corresponding to vertices that immediately preceded it in the DAG. The hash of that created block is then determined. Step 800, which is part of a iterative loop with Step 700, consists of Step 851 which identifies and adds the records of the successors to the vertices which have had their blocks and hashes generated in the data store named "To_Hash", and also consists of decision Step 852 which returns control to Step 751 till the data store "To_Hash" is empty signifying that all vertices have been processed. Step 700 is further described in more detail in FIG. 9 and in the description of FIG. 9 below. Step 800 is further described in more detail in FIG. 10 and in the description of FIG. 10 further below.

Figure 7:
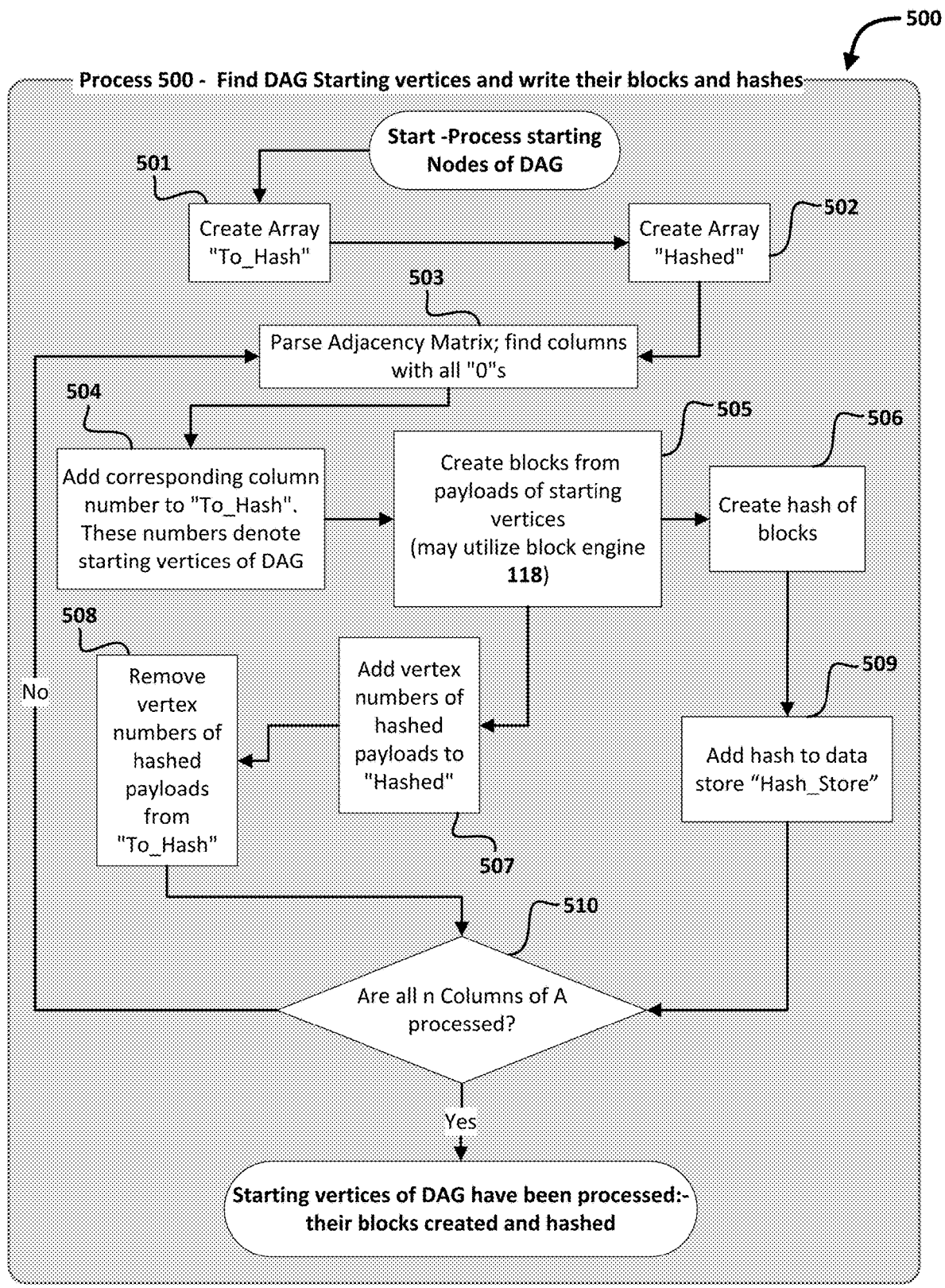
FIG. 7 illustrates an example flowchart of process 500 to create blocks from the starting vertices of the DAG.

FIG. 7 is a flow chart illustration of the process 500 for identification of the first vertices or first vertex in the DAG sequence and the creation of their blocks and the hashes of those blocks. Process 500 corresponds to Step 500 in FIG. 6. The DAG starting vertices are those vertices that do not have incoming edges. In Steps 501 and 502, 2 internal data stores, one to store a set of vertex numbers identifying vertices to be processed, and the other to store a set of vertex numbers identifying vertices that have been processed are created. While the exemplary non-limiting process illustrated and described here makes no assumptions about the format of the data, these data stores are arrays in this realization. The Steps 501 and 502 to create the data stores may be at any point prior to adding contents to these data stores. The Array "To_Hash" is created in Step 501 to store the vertex numbers denoting vertices that do not possess blocks and therefore not yet processed. The Array "Hashed" is created in Step 502 to store the vertex numbers denoting vertices that possess blocks and the hashes of those blocks and therefore having been processed. While the exemplary non-limiting algorithm illustrated and described here shows the Step 501 preceding Step 502, these two steps may be in any order with respect to each other. Starting vertices are then identified in Step 503 by parsing each column of the Adjacency Matrix A to find all columns that have no "1" s. The column numbers of these columns with all "0"'s are coincident with the vertex numbers of the starting vertices, in other words, a column i which contains all "0"s indicates a vertex number i that is a starting DAG vertex. The iterative loop comprised of Steps 503, 504, 505, 506, 507, 508, 509 includes the Step 510 for determining if all the columns of Adjacency A have been processed to discover starting DAG vertices, the process returning back to Step 503 if decision Step 510 determines if there are columns of A that are yet to be checked, or terminating the process 500 if all have been checked. Following Step 503 to discover and identify starting vertices of the DAG by examination of the columns of the DAG's Adjacency Matrix A, Step 504 adds the corresponding column numbers to the "To_Hash" Array. This identification of the starting vertex numbers allows Step 505 to create blocks from the payload associated with the vertices collected in "To_Hash" after which Step 506 creates the Hash of each created block by using any suitable Hash Function. Step 505 may call block engine 118 which may use one or more functions, methods, classes or any other algorithms, internal or external to the device 20, to create the block and the hash of that block. The numbers denoting the vertex numbers that have been processed are added to the Array "Hashed" in Step 507 and removed from the Array "To_Hash" in Step 508. While the exemplary non-limiting algorithm illustrated in FIG. 7 shows Steps 507 preceding Step 508, these 2 steps may occur in any order with respect to each other. After the completion of Step 505 and Step 506, Step 509 adds the newly created hashes to a data store. For one realization exemplified in the illustration of Step 509 in FIG. 7, a datastore "Hash_Store" is used to store the hashes indexed to the blocks from which the hashes have been generated. While in the realization exemplified in the illustration of Step 509 in FIG. 7, Steps 506 and 509 are shown as occurring between Steps 505 and 510 in parallel with Steps 507 and 508, this is non-limiting. Steps 506 and 509 can be either in parallel or in any sequence with respect to Steps 507 and 508, as long as they occur between between Steps 505 and 510. While the realization exemplified in the illustration in FIG. 7 contains Steps 504 and 508, these steps are not essential to process 500 since Step 503 can proceed directly to Step 505 and the presence or absence of these Steps do not constitute a limitation to this invention.

Figure 8:
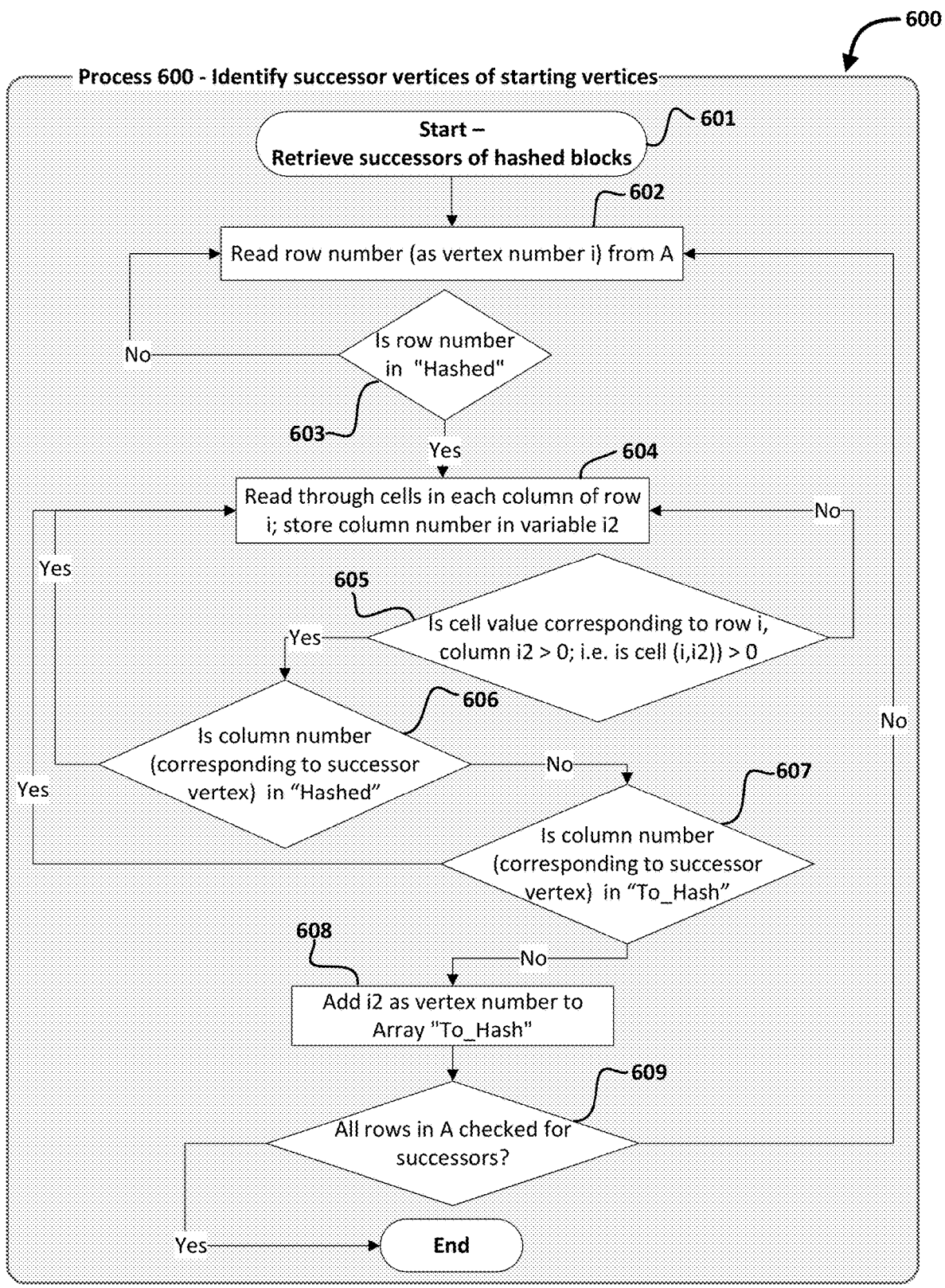
FIG. 8 illustrates an example flowchart of process 600 that identifies successor vertices of starting vertices of the DAG.

FIG. 8 is a flow chart illustration that exemplifies the process 600 for the identification and recording of successor vertices of starting vertices that follows the process 500 where the starting DAG vertices have been identified and processed. Process 600 corresponds to Step 600 in FIG. 6, being a more detailed flowchart and description of the afore-described Step 600. Within this process 600, i denotes a variable that is used to store a row number of Array A, and i2 denotes a variable that is used to store a column number of Array A, such that i refers to the vertex number for which succeeding vertices are sought to be determined and i2 stores a vertex number of a possible succeeding vertex. If in A, any cell (i,i2) !=0; then i2 is a successor and it is recorded by adding the Array "To_Hash". The identification of these variables in process 600 by i and i1 is arbitrary and this process is not limited by the choice of these identifiers. The process 600 contains an iterative loop comprised of Steps 602, 603, 604, 605, 606, 607, 608, 609 with nested loops. These steps iterate through every vertex, determine if it has been identified as a starting DAG Vertex, and if so determined iterate through possible succeeding vertices till all succeeding vertices have been found. These steps are described sequentially. The iterative loop comprised of Steps 602 and 603, consists of Step 602 to read row numbers as i from Matrix A, followed by the Step 603 for determining if the vertex corresponding to that row number has been processed by verifying if the row number i is present in the Array "Hashed". The loop returns back to Step 602 if decision Step 603 determines that the row number i corresponding to that vertex is not in the Array "Hashed". If the vertex is determined to have been processed, the process proceeds to an iterative loop comprised of Steps 604 and 605, with Step 604 to iterate through each cell of the row i of Matrix A (i corresponds to the processed vertex number whose successors are being identified), returning back to Step 604 if decision Step 605 determines if a cell in the row i contains a "0". The column number of Matrix A corresponding to that cell is identified and stored in variable i2. If Step 605 determines that a successor has been found, by finding a column i2 of A which does not contain a "0", the number of this succeeding vertex is i2, and the decision Step 606 follows. Step 606 verifies if the successor vertex whose number is stored in variable i2 is not already processed by determining the absence of that vertex number in the Array "Hashed". If Step 606 determines that the vertex number corresponding to the number is stored in variable i2 is not already processed, decision Step 607 follows. If Step 606 determines that the vertex number corresponding to the number is stored in variable i2 has already been processed, the process returns to Step 604 to proceed to the next cell of row i. Decision Step 607 determines that the vertex whose number is stored in variable i2 is not already present in the Array "To_Hash". If Step 607 determines that that the vertex whose number is stored in variable i2 is not already present in the Array "To_Hash", the vertex number, which is stored in variable i2 is added to Array "To_Hash" in Step 608, and the process proceeds to decision Step 609. If Step 607 determines that that the vertex whose number is stored in variable i2 is already present in the Array "To_Hash", the process returns back to Step 604 to proceed to the next cell of row i. Decision Step 609 returns the process back to Step 602 till it is determined that all the rows in A have been checked. If all rows in Matrix A have been checked, the process 600 is terminated as all the vertices that succeed the starting vertices have been identified and recorded.

Figure 9:
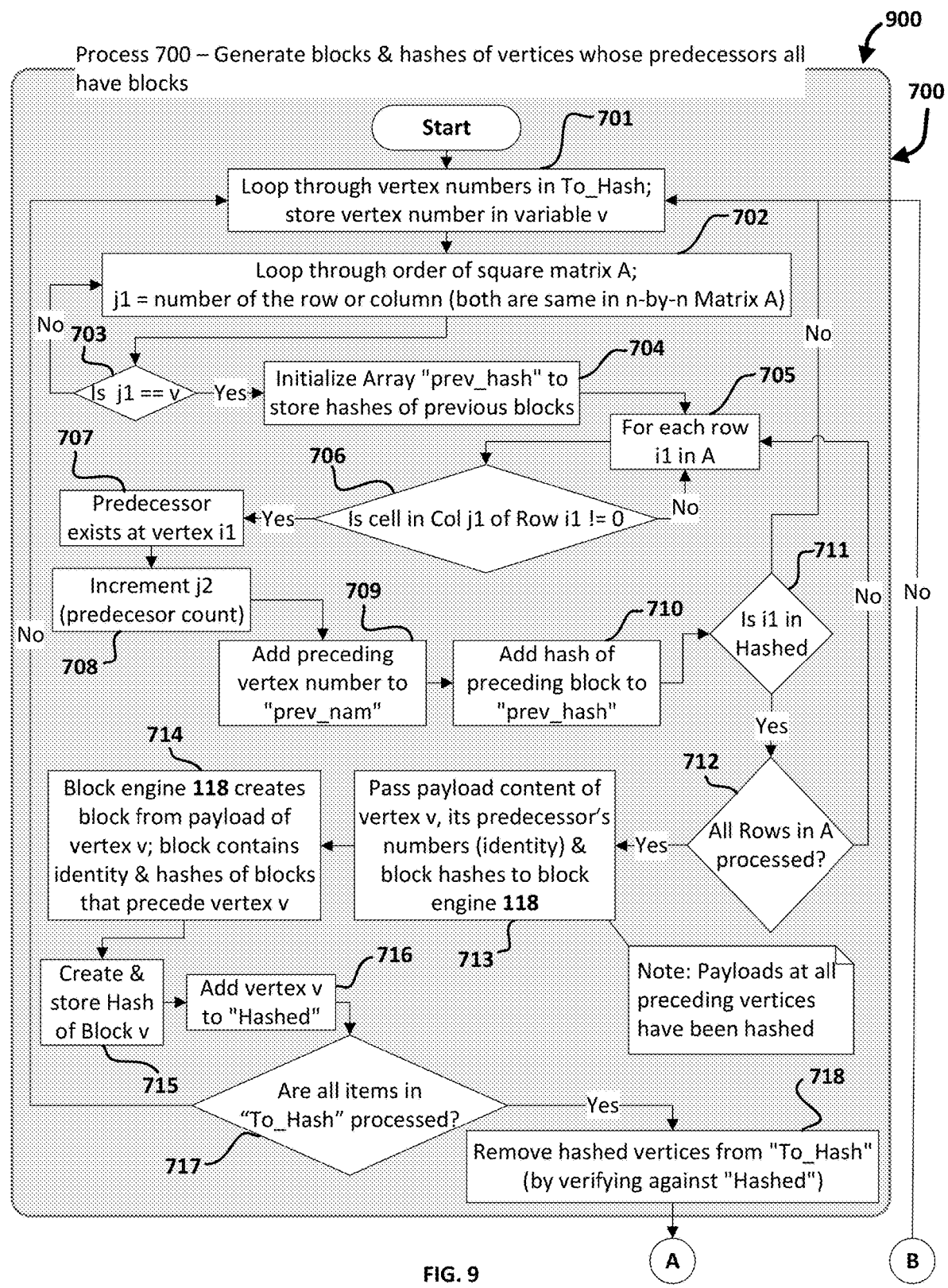
FIG. 9 illustrates an example flowchart of process 900 that processes the remaining vertices of the DAG.
Figure 9:
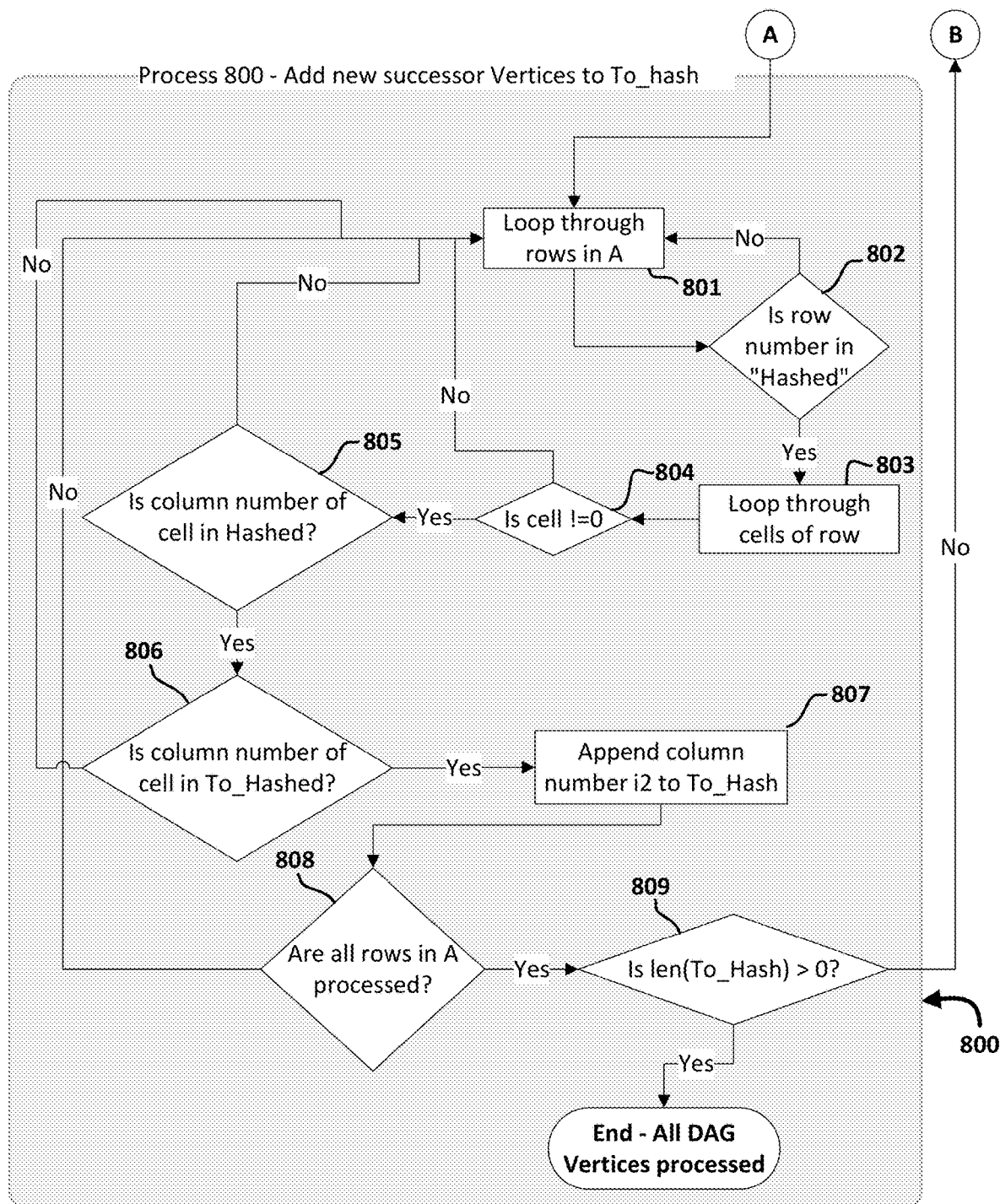

FIG. 9 is a flow chart illustration that exemplifies the process 900 for the processing of the remaining DAG vertices. Process 900 is comprised of 2 processes: the process 700 and the process 800. Process 700 generates blocks & block Hashes from those vertices whose predecessors all have blocks and the process 800 identifies and records new successor vertices to vertices processed in process 700. The processes 700 and 800 constitute a recursive algorithm that runs until Array "To_Hash" is empty signifying the processing of all vertices of the DAG. Process 700 corresponds to Step 700 in FIG. 6, being a more detailed flowchart and description of the afore-described Step 700. Similarly, process 800 corresponds to Step 800 in FIG. 6.

Following the completion of process 600 which identifies and records the successor vertices of the DAG starting vertices and stores the vertex numbers of the successor vertices in Array "To_Hash", an iterative loop starting at Step 701 finds all predecessors to each vertex in Array "To_Hash". The loop commences with Step 701 which progressively reads the vertex numbers in Array "To_Hash" and uses a variable denoted "v" to store the vertex number being handled forming a loop comprised of the Steps up to Step 717. The identification of this variable by "v" is arbitrary and this process is not limited by the choice of this identifier. Following this an iterative loop beginning with Step 702 traverses through the vertex numbers of the DAG by traversing the order 1 to n of the n-by-n Matrix A of the DAG, using a variable denoted by variable name "j1" to store the vertex number being considered within the sequence 1 to n. The identification of this variable by "j1" is arbitrary and this process is not limited by the choice of this identifier. This number stored in variable j1 corresponds to a vertex number of the DAG and when a number that matches the vertex number stored in v is reached, as verified by the decision Step 703, the existence of predecessors for that vertex number v will then be determined. The Steps 701, 702 and 703 constitute a checking loop to ensure that any number that is read from the Array "To_Hash" is a vertex of the DAG. If this check is unnecessary, the vertex number stored in the variable j1 can be read directly from the Array "To_Hash in Step 701. The existence of predecessors for the vertex number read from array "To_Hash" is determined by an iterative loop constituted by Step 705 and decision Step 706 verify if the column number j1, which corresponds to the vertex number v being handled contains non-zero cells. Decision Step 706 returns the process to Step 705 if a cell is not a non-zero cell. The presence of a non-zero integer in the column corresponding to the vertex number indicates the presence of a predecessor, in which case the loop with Steps 708, 709, 710, 711 verifies if the predecessor has a block and its hash. A data store represented here by an Array named "prev_nam" is initialized in Step 709, to which the number or the identifier of the identified preceding vertex is appended. The name of the Array "prev_nam" is non-limiting, and any non-conflicting name may be used. A data store represented here by an Array named "prev_hash" is initialized in Step 710, to which the hash of the block corresponding to the identified preceding vertex is appended. The hash corresponding to any identified previous vertex may be identified and found in the datastore "Hash_Store." The name of the Array "prev_hash" is non-limiting, and any non-conflicting name may be used. While the exemplary non-limiting process illustrated and described here utilizes arrays for the data stores "prev_nam" and "prev_hash" for one realization, this does not limit the use of any format or storage for these data stores. In decision Step 711, the Array Hashed, which contains the vertex numbers of the processed vertices, is searched for the presence of the vertex number determined to be a predecessor. If Step 711 determines that the predecessor vertex has not been processed, the process returns to the starting Step 701. If Step 711 determines that the predecessor vertex has been processed, decision Step 712 verifies if all the vertices of the DAG have been interrogated by processing all the rows of the column number of A corresponding to the vertex being handled (vertex number being stored in variable j1 and h). If in Step 712 it is not affirmed that all the vertices have been interrogated to find all preceding vertices to the vertex number v that is being handled, the process returns to Step 705 to process the remaining cells in the column corresponding the vertex v. If in Step 712 it is affirmed that all the vertices have been interrogated to find all preceding vertices to the vertex number v that is being handled, Steps 713, 714 and 715 follow. These steps outline one non-limiting realization of creating a block from the vertex v and creating a hash of that newly created block. The vertex numbers and the hashes of the blocks corresponding to the preceding vertices, now stored in the Arrays "prev_nam" and "prev_hash" are passed to block engine 118 in Step 713. The vertex numbers of the preceding blocks will uniquely identify them as corresponding to a preceding vertex. Block engine 118 may use one or more functions, methods, classes or any other algorithm to create a block corresponding to that vertex number v that is being handled in Step 714. This block for the vertex v will include the hashes of the blocks of all its preceding vertices, any optional or pertinent information about or relating to the preceding vertices such as their names and portions of their payloads, and the payload corresponding to the vertex v. In a typical implementation the information and the hashes corresponding to the vertices that precede vertex v may be in the header of the block, and the payload corresponding to the vertex v itself may be in the body of the block. Step 715, which may be included in block engine 118, creates a hash from each created block by using any suitable Hash Function. The created hashes may be stored in the datastore "Hash_Store." Step 716 adds the processed vertex v to the Array "Hashed". The Step 710 creates an Array to store the hashes of the blocks of the preceding vertices, but the storage of those hashes in that Array may be optional and this process in not limited by this. This is because in an alternate implementation the vertex numbers of the preceding vertices may be used to interrogate a data-store containing the hashes of the blocks of those vertices, such as the datastore "Hash_Store," yielding a similar result. Following this, Step 717 determines if all the items in the Array "To_Hash" have been processed. Failing this check process control is returned to Step 701 to proceed to the next vertex to process.

As noted earlier, FIG. 9 also illustrates the process 800 to identify and record new successor vertices to vertices processed in process 700. Step 801 traverses through the rows 1 to n of the n-by-n Matrix A of the DAG to identify row numbers corresponding to vertices that have been hashed. The following decision Step 802 performs a check to see if the row number identified in Step 801 is present in the Array "Hashed". If the row number is not present in the Array "Hashed", the process control is returned to Step 801 to iterate to the next row of A. If the row number is present in the Array "Hashed", its succeeding vertices are identified and recorded in the following Steps. Step 803 iterates through all the cells in that row of the adjacency matrix A and performs a check in decision Step 804 to verify if the contents of any of these cells are "0". The presence of a non-zero integer in that row of A, in this case "1", indicates the presence of a succeeding vertex. The vertex number of the succeeding vertex is provided by the column number of the cell in Matrix A. Decision Step 805 determines if the succeeding vertex number thus determined is already present in the Array "Hashed" to ensure that it has not already been processed, and Step 806 determines if the succeeding vertex number thus determined is already present in Array "To_Hash". If the outcome of either of these verification steps is "No", control of the process is returned to Step 801. If the Steps 805 and 806 verify the absence of the succeeding vertex number in both the Array "Hashed" and "To_Hash", that vertex number is appended to Array "To_Hash" in Step 807. Following this, Step 808 determines if all the rows in A have been traversed and checked. If all the rows in A have not been traversed and checked, control of the process is returned to Step 801 to check the next row of A. If all the rows have been checked and all possible succeeding vertices of already processed vertices recorded for processing the Array "To_Hash", decision Step 809 will determine if the Array "To_Hash" is empty. If the Array "To_Hash" is not empty indicating that there are vertices to be processed, decision Step 809 will pass control to starting Step 701 of process 700 to process those vertices. If decision Step 809 determines that all vertices have been processed, the process 900 is terminated since all the vertices of the DAG have now been processed into hash linked blocks.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method comprising:
   accessing, by a processor, input data modeled or representable as a directed acyclic graph (DAG), the input data containing information to identify vertices and edges, where the vertices are records containing data payloads and the edges are records that confirm in what sequence a vertex is related to the other vertices that comprise the DAGs;
   receiving at least one request to generate an output data encoded as hash linked blocks according to said input data, each block including a vertex record and also including the hashes of the blocks that precede that block in the DAG sequence if that corresponding vertex has a predecessor;
   constructing or accessing a directed acyclic graph (DAG) model of the input data that is based on sequential dependencies in said input data;
   constructing an Adjacency Matrix based on sequential dependencies between vertices of said DAG model of the input data;
   finding the DAG Starting vertices or DAG Starting vertex by accessing said Adjacency Matrix that encodes the sequential relationships between DAG vertices, and processing said vertices by generating blocks corresponding to each starting vertex; and
   adding identifiers of these processed vertices to a first dedicated data store;
   identifying successor vertices of the starting vertex or vertices using the Adjacency Matrix; and
   adding identifiers of these successor vertices to a second dedicated data store; and
   using criteria that includes a verification process to verify if all the preceding vertices of each vertex in the second data store have been processed into blocks;
   processing verified vertices by generating their blocks through processing payloads of each verified vertex in the second data store, and adding the corresponding processed vertex payload and the hashes of each of the preceding blocks to the record of each generated block; and
   adding identifiers of said processed vertices to the first datastore and removing those identifiers from the second data store; and after each vertex in the second data store has been through the verification process;
   identifying successor vertices to the newly processed vertices and;
   adding identifiers of those successor vertices to the second dedicated data store; and
   generating blocks by processing payloads, and identifying preceding blocks and obtaining hashes from said preceding blocks for each vertex in the second datastore, only if the vertex has passed the verification process; and after each vertex in the second data store has been through the verification process;
   adding identifiers of the processed vertices to the first datastore, removing those identifiers from the second datastore; and
   identifying successor vertices to newly processed vertices; and
   adding identifiers of identified successor vertices to the second dedicated data store; and
   repeating the steps of verifying; processing verified vertices by generating blocks from said verified vertices; adding processed vertices to the first data store; and identifying succeeding vertices to add to the second datastore, until there are no more additions available to be made to the first data store and the second data store is empty signifying that all the vertices have been processed into blocks sequentially connected by hashes in accordance with the DAG.

2. The computer implemented method of claim 1, wherein block generation includes adding relevant records from the associated vertex being processed as a new block, and also includes adding records of hashes obtained from each and every previous block to the new block, these previous blocks being associated with the immediately preceding vertices to the vertex associated with the new block.

3. The computer implemented method of claim 2 wherein vertex identifiers of the immediately preceding vertices are identified by accessing the Adjacency Matrix that encodes sequential relationships between the DAG vertices.

4. The computer implemented method of claim 2, wherein vertex identifiers of immediately preceding vertices are collected into a data store for inclusion into the records of the block corresponding to a vertex.

5. The computer implemented method of claim 2, wherein hashes of each block corresponding to said preceding vertices are collected into a data store for inclusion into the records of the block corresponding to a vertex.

6. The computer implemented method of claim 1 wherein the verification process further comprises preceding vertices are identified by accessing the Adjacency Matrix and the existence of blocks corresponding to those preceding vertices is attested.

7. The computer implemented, method of claim 6, wherein attestation of preceding vertices having been processed into blocks happens by checking the first datastore for the presence of the identifiers of all these preceding vertices, signifying that these vertices have been processed.

8. The computer implemented method of claim 1, wherein the first data store are comprised of unique vertex identifiers, vertex numbers, of the vertices that have been processed.

9. The computer implemented method of claim 1, wherein the second data store contents are comprised of the unique vertex identifiers, vertex numbers, of the vertices to be processed.

10. The computer implemented method of claim 1, wherein the verification process further comprises the generation of a hash corresponding to a block can occur at any time between block creation and inclusion of said hash into another block.

11. A system comprising:
a memory;
a processor, that communicatively coupled with the memory, where the processor is configured to perform
accessing, by a processor, input data modeled or representable as a directed acyclic graph (DAG), the input data containing information to identify vertices and edges, where the vertices are records containing data payloads and the edges are records that confirm in what sequence a vertex is related to the other vertices that comprise the DAGs;
receiving at least one request to generate an output data encoded as hash linked blocks according to said input data, each block including a vertex record and also including the hashes of the blocks that precede that block in the DAG sequence if that corresponding vertex has a predecessor;
constructing or accessing a directed acyclic graph (DAG) model of the input data that is based on sequential dependencies in said input data;
constructing an Adjacency Matrix based on sequential dependencies between vertices of said DAG model of the input data;
finding the DAG Starting vertices or DAG Starting vertex by accessing said Adjacency Matrix that encodes sequential relationships between DAG vertices, and processing said vertices by generating blocks corresponding to each starting vertex; and
adding identifiers of these processed vertices to a first dedicated data store;
identifying successor vertices of the starting vertex or vertices using the Adjacency Matrix; and
adding identifiers of these successor vertices to a second dedicated data store; and
using criteria that includes a verification process to verify if all the preceding vertices of each vertex in the second data store have been processed into blocks;
processing verified vertices by generating their blocks through processing payloads of each verified vertex in the second data store, and adding the corresponding processed vertex payload and the hashes of each of the preceding blocks to the record of each generated block; and
adding identifiers of said processed vertices to the first datastore and removing those identifiers from the second data store; and after each vertex in the second data store has been through the verification process;
identifying successor vertices to newly processed vertices; and
adding identifiers of the successor vertices to the second dedicated data store; and
generating blocks by processing payloads, and identifying preceding blocks and obtaining hashes from said preceding blocks for each vertex in the second datastore, only if the vertex has passed the verification process; and after each vertex in the second data store has been through the verification process;
adding identifiers of the processed vertices to the first datastore, removing those identifiers from the second datastore; and
identifying successor vertices to newly processed vertices; and
adding identifiers of identified successor vertices to the second dedicated data store; and
repeating the steps of verifying; processing verified vertices by generating blocks from said vertices; adding processed vertices to the first data store; and identifying succeeding vertices to add to the second datastore, until there are no more additions available to be made to the first data store and the second data store is empty signifying that all the vertices have been processed into blocks sequentially connected by hashes in accordance with the DAG.

12. The system of claim 11 wherein block generation includes adding relevant records from the associated vertex being processed to a new block, and also includes adding records of hashes obtained from each and every previous block to the new block, these previous blocks being associated with the immediately preceding vertices to the vertex associated with the new block.

13. The system of claim 12, wherein vertex identifiers of the immediately preceding vertices are identified by accessing the Adjacency Matrix that encodes sequential relationships between the DAG vertices.

14. The system of claim 12, wherein vertex identifiers of immediately preceding vertices are collected into a data store for inclusion into the records of the block corresponding to a vertex.

15. The system of claim 12 wherein hashes of each block corresponding to said preceding vertices are collected into a data store for inclusion into the records of the block corresponding to a vertex.

16. The system of claim 11, wherein the verification process further comprises preceding vertices are discovered by accessing the Adjacency Matrix and the existence of blocks corresponding to those preceding vertices is attested.

17. The system of claim 16, wherein attestation of preceding vertices having been processed into blocks happens by checking the first datastore for the presence of the identifiers of all these preceding vertices, signifying that these vertices have been processed.

18. The system of claim 11 wherein contents of the first data store are comprised of unique vertex identifiers, vertex numbers, of the vertices that have been processed.

19. The system of claim 11 wherein contents of the second data store are comprised of unique vertex identifiers, vertex numbers, of the vertices to be processed.

20. The system of claim 11, wherein the generation of a hash corresponding to a block can occur at any time between block creation and inclusion of said hash into another block.

* * * * *